(12) United States Patent
Lorin De La Grandmaison et al.

(10) Patent No.: US 7,585,151 B2
(45) Date of Patent: Sep. 8, 2009

(54) ROTORCRAFT BLADE PROVIDED WITH A FLAP THAT IS TILTABLE WITH THE HELP OF AT LEAST ONE MAIN BALL JOINT HAVING A FIRST SHAFT THAT IS SECURED TO SAID FLAP

(75) Inventors: Francois Lorin De La Grandmaison, Hennebont (FR); Michel Morant, Bouc Bel Air (FR); Olivier Ardesi, Aix en Provence (FR); Jacques Gaffiero, Paris (FR)

(73) Assignee: Eurocopter, Marignane (FR)

( * ) Notice: Subject to any disclaimer, the term of this patent is extended or adjusted under 35 U.S.C. 154(b) by 443 days.

(21) Appl. No.: 11/585,207

(22) Filed: Oct. 24, 2006

(65) Prior Publication Data
US 2007/0098553 A1 May 3, 2007

(30) Foreign Application Priority Data
Oct. 26, 2005 (FR) .................... 05 10916

(51) Int. Cl.
*B64C 27/615* (2006.01)
(52) U.S. Cl. ...................................... 416/24
(58) Field of Classification Search ............ 416/23, 416/24; 244/215
See application file for complete search history.

(56) References Cited

U.S. PATENT DOCUMENTS 3,129,769 A * 4/1964 Hofbauer et al. ............... 416/24
5,344,103 A * 9/1994 Fitzgibbon et al. ........... 244/213
5,639,215 A * 6/1997 Yamakawa et al. ............ 416/23
6,149,386 A * 11/2000 Rampal ....................... 416/114
6,152,692 A * 11/2000 Aubry .......................... 416/24
6,168,379 B1 * 1/2001 Bauer ........................... 416/23
6,454,207 B1   9/2002 Yamakawa et al.
2002/0021964 A1   2/2002 Janker et al.

FOREIGN PATENT DOCUMENTS

DE   203 20 625   11/2004
FR   2 770 826    5/1999

* cited by examiner

*Primary Examiner*—Ninh H Nguyen
(74) *Attorney, Agent, or Firm*—Young & Thompson

(57) ABSTRACT

The present invention relates to a rotorcraft rotor blade (1) having at least one trailing edge flap (5) that is tiltable, the flap (5) being suitable for pivoting about a virtual hinge axis (Y') extending substantially along the span of the blade (1) and of the flap (5). The blade (1) is remarkable in that the flap (5) is provided with at least one main ball joint (30) having an inner cage (32) and an outer cage (33), and a first shaft (31) secured to the flap (5), the front portion (33') of the outer cage (33) of the main ball joint (30) being connected to a linear actuator (10) which is arranged in the blade (1) and which enables the flap (5) to be pivoted, the first shaft (31) of the main ball joint (30) extending substantially perpendicularly to the virtual hinge axis (Y') about which the flap (5) pivots.

8 Claims, 2 Drawing Sheets

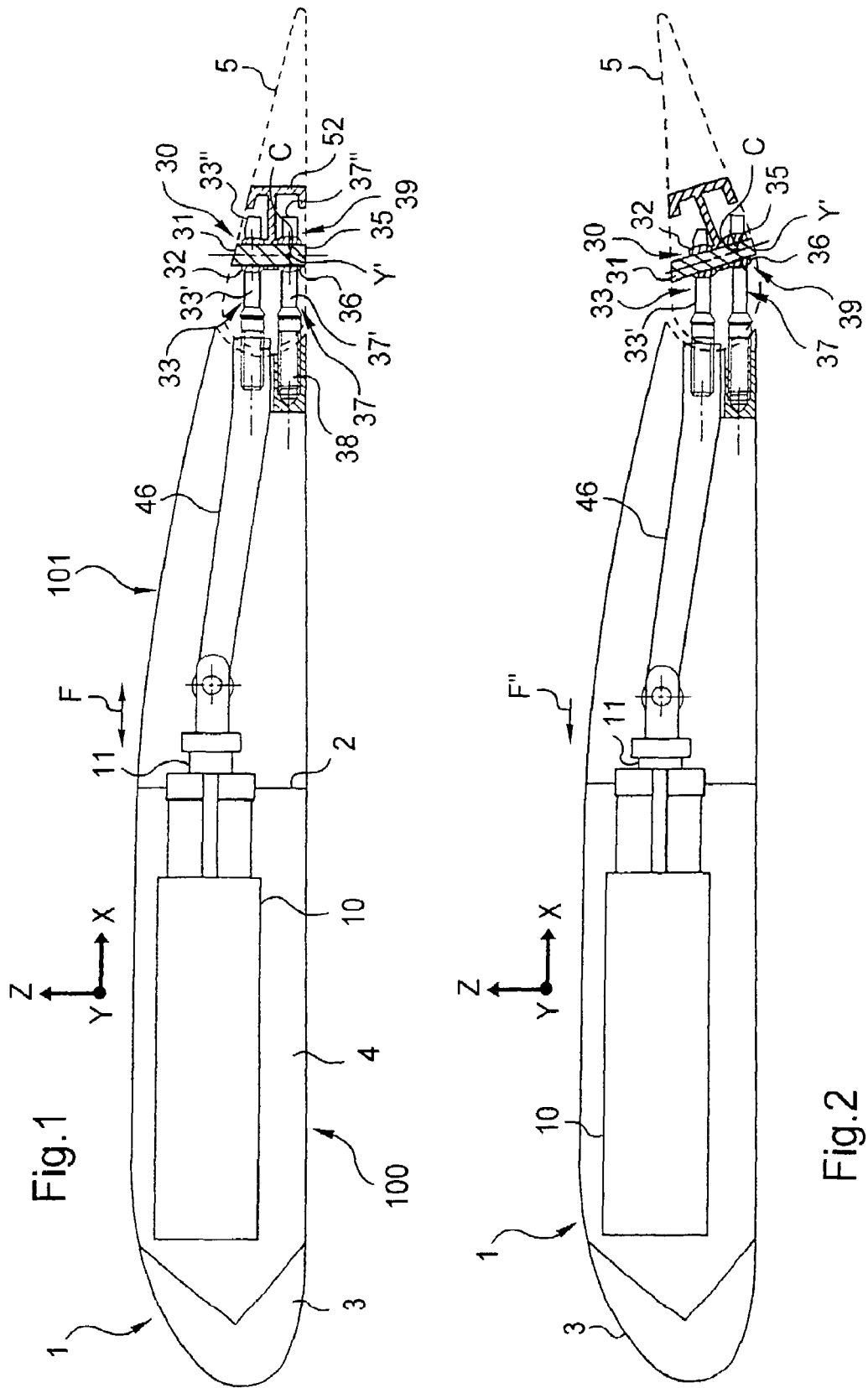

ROTORCRAFT BLADE PROVIDED WITH A FLAP THAT IS TILTABLE WITH THE HELP OF AT LEAST ONE MAIN BALL JOINT HAVING A FIRST SHAFT THAT IS SECURED TO SAID FLAP

The present invention relates to an active blade for a rotorcraft, the blade being provided at its trailing edge with a flap that is tiltable with the help of at least one main ball joint, and that is locally controlled by an electromechanical device including a linear actuator.

BACKGROUND OF THE INVENTION

In order to improve the aero-acoustic, vibratory, and aerodynamic performance of the blades of a main rotor for providing a rotorcraft with lift and propulsion, it is advantageous to have a tiltable flap along the trailing edge of each blade, referred to for convenience as a trailing edge flap.

The angle to which the flap can be tilted relative to the blade is of the order of ±10° at a frequency of about 30 hertz (Hz). In order to be effective, the angle of tilt varies actively over time as a function of numerous parameters, such as: the position of the blade around the axis of the main rotor, which position is known as its "azimuth"; the speed of rotation of the main rotor; and the pitch, flapping, and lag movements of the blade.

Given the dimensions of the blade and the stresses acting on the flap and the blade due to the flapping, lag, and pitch movements of the blade, it can readily be understood that there are difficulties to be overcome in order to obtain a flap that is reliable, lightweight, and capable of satisfying the expectations of the manufacturer and of users.

Patent document US 2002/0021964 discloses a first type of blade provided with a flap. The top and bottom portions of the leading edge of the flap are convex in shape while the central portion of the leading edge is concave in shape. The leading edge of the flap is thus ϵ-shaped.

In addition, the top and bottom portions are each connected to a respective actuator, while the concave central portion is placed against a bearing element secured to the blade. Consequently, by activating one or other of the actuators, the flap tilts about the bearing element so as to present the desired angle of inclination.

However, under the effect of the stresses exerted on the blade and the flap in flight, in particular those caused by flapping movements, there is a risk of the flap sliding along the bearing element which can lead to premature wear, or even, in a worst-case scenario, to the flap becoming jammed so as to become unusable and dangerous.

Furthermore, it can clearly be seen that the overall shape of the flap and more particularly of the leading edge of the flap is not optimum from an aerodynamic point of view, which might lead to disagreeable noise or vibration and to degraded aerodynamic performance.

Furthermore, patent document U.S. Pat. No. 6,454,207 discloses a second type of blade having a flap at its trailing edge.

The flap is secured to the blade by a longitudinal shaft, i.e. extending along the span of the blade, which passes through the flap. Consequently, the flap is suitable for pivoting about said longitudinal shaft, being moved by a hinged connecting rod secured to the pressure side of the flap, said connecting rod itself being controlled by an actuator. Part of the connecting rod thus lies outside the blade-and-flap assembly, which is bad for the aerodynamic performance thereof.

That second type of architecture in which the flap pivots about a shaft also presents the drawback of the flap possibly jamming in flight. It should not be lost from sight that the mechanical stresses exerted on the flap and the blade in flight are very high. Consequently, there is a non-negligible risk of the shaft becoming deformed, and as a result of the flap being prevented from tilting to the desired angle of inclination.

Finally, patent document FR 2 770 826 discloses a third type of blade fitted with a flap. The flap is no longer connected to the blade by a longitudinal shaft, but by two stub axles located at opposite ends of the flap. In addition, the flap is provided with a flexible arm that is positioned inside the blade, being connected via a lever to a set of two rotary motors acting on coaxial eccentrics. By means of those two rotary motors, the device controls the angled inclination of the flexible arm and thus of the flap.

Nevertheless, as for the second type of blade, the stub axles about which the flap pivots do not appear to present sufficient robustness to guarantee proper operation of the system over a reasonable length of time.

OBJECT AND SUMMARY OF THE INVENTION

An object of the present invention is to propose an active blade provided with a flap that makes it possible to overcome the above-mentioned limitations of blades.

Furthermore, it should be recalled that rotorcraft blades are extremely thin, i.e. that the relative thickness of blade sections is small, such that the thickness of the blade is small, particularly in the vicinity of a trailing edge where thickness tapers. Thus, the maximum thickness of the flap is about 20 millimeters. Under such circumstances, it is clear that the device enabling the flap to tilt relative to the blade must be compact in order to be capable of being housed in the blade and/or the flap.

Furthermore, as mentioned above, it is important for the assembly to be robust in order to avoid premature wear or even jamming of the flap, which might be catastrophic.

Finally, in order to reduce the inertial forces exerted on the blade and the flap, it is essential for the mass of the assembly to remain as small as possible.

According to the invention, a rotorcraft rotor blade has at least one trailing edge flap that is tiltable, the flap being suitable for pivoting about a virtual hinge axis extending substantially along the span of the blade and of the flap. The blade is remarkable in that the flap is provided with at least one main ball joint having an inner cage and an outer cage, and a first shaft secured to the flap, the front portion of the outer cage of the main ball joint being connected to a linear actuator that is arranged in the blade and that enables the flap to be pivoted, the first shaft of the main ball joint extending substantially perpendicularly to the virtual hinge axis about which the flap pivots.

This configuration is highly original since the shaft of the main ball joint does not coincide with the virtual hinge axis about which the flap pivots and at very least does not extend therealong. This is of great importance insofar as it becomes possible to arrange the ball joint in a space that can be very small.

The use of such a ball joint makes it possible to satisfy the problem effectively since the robustness of that kind of mechanical equipment is well known. Furthermore, there is no need to provide the flap with a longitudinal shaft or with stub axles in order to enable it to pivot, thus limiting any risk of the flap jamming.

As described with the help of the figures, in order to limit wear of the main ball joint, it can be prestressed, where necessary.

Furthermore, the main ball joint is advantageously self-lubricating, the faces of the outer and inner cages that come into contact with each other being covered in Teflon, for example.

In addition, pivoting of the flap is optimized when the axis of symmetry of the main ball joint is arranged substantially at 25% of the chord of the flap starting from the leading edge of the flap.

Furthermore, the first shaft of the main ball joint is not secured to the blade but rather to the flap. In addition, the front portion of the outer cage of the main ball joint is connected to the actuator by a single connecting rod, which may be bent, where necessary.

Under such conditions, the flap has a fastener ball joint provided with an outer cage and an inner cage together with a second shaft secured to the flap, the front portion of the outer cage of the fastener ball joint being secured to a stationary point of said blade. The flap then moves as follows: the actuator pulls or pushes the outer cage of the main ball joint. Since the outer cage of the fastener ball joint cannot be moved, given that it is secured to a stationary point of the blade, the first and second shafts tilt, thereby enabling the flap to pivot.

In a first embodiment, the first and second shafts coincide, which means that the main and fastener ball joints are one above the other.

In a second embodiment, the first and second shafts are offset relative to each other along the span direction of the flap, and also along a vertical axis.

Finally, whatever embodiment is selected, as a function of the actuator, of the size of the flap, and of the stresses that arise in flight, it is possible to envisage using a larger number of actuators and of main ball joints, with each actuator being associated with a respective main flap. Consequently, when the blade has two actuators, the blade is provided with two main ball joints, and the distance between the two main ball joints along the span direction of the flap is preferably equal to half the span of the flap.

BRIEF DESCRIPTION OF THE DRAWINGS

The invention and its advantages appear in greater detail from the following description of preferred embodiments given without any limiting character and made with reference to the accompanying figures, in which:

FIG. 1 is a diagrammatic section view of a blade in a first embodiment of the invention;

FIG. 2 shows the movement implemented by the first embodiment;

Figure 3:
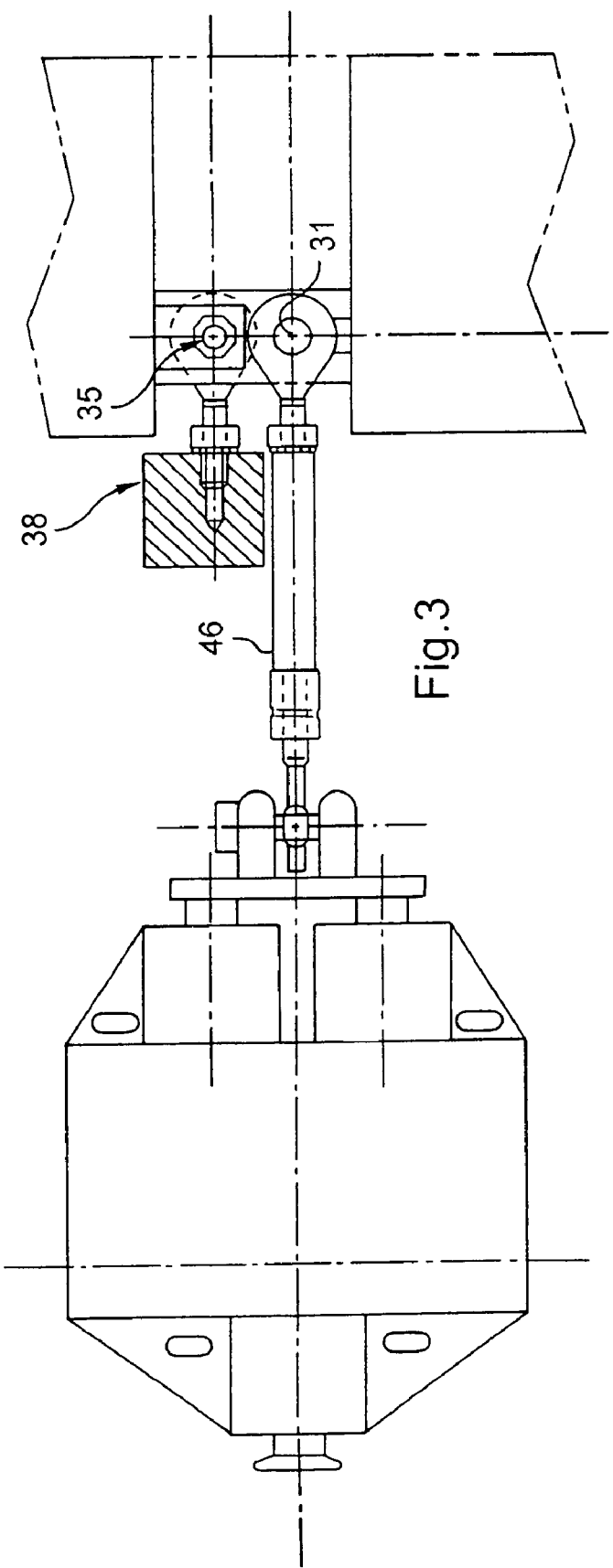
FIG. 3 is a diagrammatic view of a second embodiment.

Elements that are present in more than one of the figures are given the same references in each of them.

MORE DETAILED DESCRIPTION

FIG. 1 is a diagrammatic section showing a first embodiment of the invention.

A rotorcraft blade 1 is provided with a trailing edge flap 5. In addition, an electromechanical actuator 10 is arranged inside the box structure 4 of the blade 1, being disposed between the U-shaped rib 2 and beam 3 of the blade 1.

The actuator 10 is of the linear type, its end 11 being suitable for moving along the axis X as represented by double-headed arrow F. Access hatches 100 can be seen in the pressure side face of the blade 1, e.g. to enable maintenance operations to be performed on the actuator 10.

In addition, the actuator 10 enables the trailing edge flap 5 to pivot about a virtual hinge axis Y' in order to improve the aero-acoustic, aerodynamic, and vibratory performance of the blade 1. It is controlled by an electronic unit (not shown) which delivers the control relationship for the flap (tilt angle/frequency) as a function of the flight configuration of the rotorcraft. The actuator 10 is powered electrically by means of a slip-ring unit disposed in the rotorcraft rotor and via an electrical circuit integrated in the blade 1, running along its span.

In active mode, position sensors deliver signals to the electronic unit so as to enable it to servo-control the position of the flap. In certain flight configurations, the system takes on a passive mode with the flap 5 then remaining stationary in a position that extends the basic profile of the blade 1.

Depending on requirements, one or more flaps are arranged along the span of the blade 1, preferably in the vicinity of its free edge.

Furthermore, in order to be tilted, the flap 5 comprises a main ball joint 30 with a first shaft 31, an inner cage 32, and an outer cage 33, the inner and outer cages 32 and 33 being disposed inside the flap 5. The first shaft 31 of the main ball joint 30 is secured to the flap 5 via a fastening to the rib 52 of the flap 5, for example. In addition, and preferably, the first shaft 31 of the main ball joint 30 is substantially perpendicular to the vertical hinge axis Y' of the flap 5.

Furthermore, the front portion 33' of the outer cage 33 of the main ball joint 30 is connected to the end 11 of the actuator 10 via a single bent connecting rod 46. In this respect, it should be observed that an access hatch 101 is provided in the suction side surface of the blade 1 in order to give an operator access to the sole connecting rod 46, should that be necessary.

In addition, the rear portion 33" of the outer cage 33 is not secured to the flap. Consequently, in order to cause the flap to pivot by means of the main ball joint, it is necessary to cause the first shaft 31 to rock.

Consequently, the flap 5 has a fastener ball joint 39 provided with a second shaft 35 secured to the flap 5, an inner cage 36, and an outer cage 37. The front portion 37' of the outer cage 37 of the fastener ball joint 39 is secured to a stationary point of the blade 1 via fastener means 38, possibly means that are adjustable in order to facilitate positioning the flap 5. The virtual hinge axis Y' about which the flap 5 is capable of pivoting then passes through the center C of the fastener ball joint 39.

This arrangement is most advantageous since the connection between the flap 5 and the blade 1 is easy to make, and also from an aerodynamic point of view, insofar as there is no disturbing projection or step associated with a fork disposed at the trailing edge of a blade, for example.

In a first embodiment, the first and second shafts 31 and 35 coincide, i.e. they constitute a single shaft.

In a second embodiment shown in FIG. 3, the first and second shafts 31 and 35 are offset relative to each other along the span of the flap, i.e. along the axis Y, and also along a vertical axis Z. This second embodiment is particularly advantageous if the dimensions of the flap 5 are particularly tight.

Furthermore, in order to limit wear of the main and fastener ball joints 30 and 39, where necessary, these joints are pre-stressed so as to eliminate the clearance between their inner and outer cages 32 & 33 and 36 & 37.

The centrifugal forces that act on the assembly comprising the flap, the main ball joint(s), and the fastener ball joint(s), exert prestress naturally on the main and fastener ball joints 30 and 39 in the span direction of the blade. If the level of this prestress is not high enough, then the inner and outer cages 32 & 33 and 36 & 37 of the main and fastener ball joints 30 and 39 remain continuously in contact in spite of the other forces (dynamic, aerodynamic, and control) to which they are subjected in the chord direction of the blade.

Nevertheless, if the level of stress delivered naturally by centrifugal force is not sufficient, the main and fastener ball joints 30 and 39 can be prestressed, mechanically. Consequently, the blade includes a spring type device inserted between the flap 5 and the trailing edge of the blade, thus enabling a continuous force to be exerted tending, for example, to move the flap 5 away from the trailing edge of the blade.

FIG. 2 shows the movement implemented in the first embodiment in order to pivot the flap 5.

The electronic unit causes the actuator 10 to move its end 11 along arrow F". The actuator 10 then retracts its end 11, thereby causing the connecting rod 46 to move towards the beam 3 of the blade 1. Since this connecting rod 46 is connected to the front portion 33' of the outer cage 33 of the main ball joint 30, the movement of the actuator 10 is delivered to the outer cage 33 which moves along the axis X, likewise in the direction of arrow F".

However, the outer cage 37 of the fastener ball joint 39 cannot move since it is secured to a stationary point of the blade 1. As a result, the assembly comprising the first shaft 31, the inner cage 32 of the main ball joint 30, the second shaft 35, the outer cage 36 of the fastener ball joint 39, and the flap 5 pivots about the virtual hinge axis Y' that passes through the center C of the fastener ball joint 39.

Since the first and second shafts 31 and 35 are secured to the flap 5, and possibly also coincide as in the example shown in FIG. 2, the flap 5 can rock so as to present the required angle relative to the blade 1.

Figure 4:
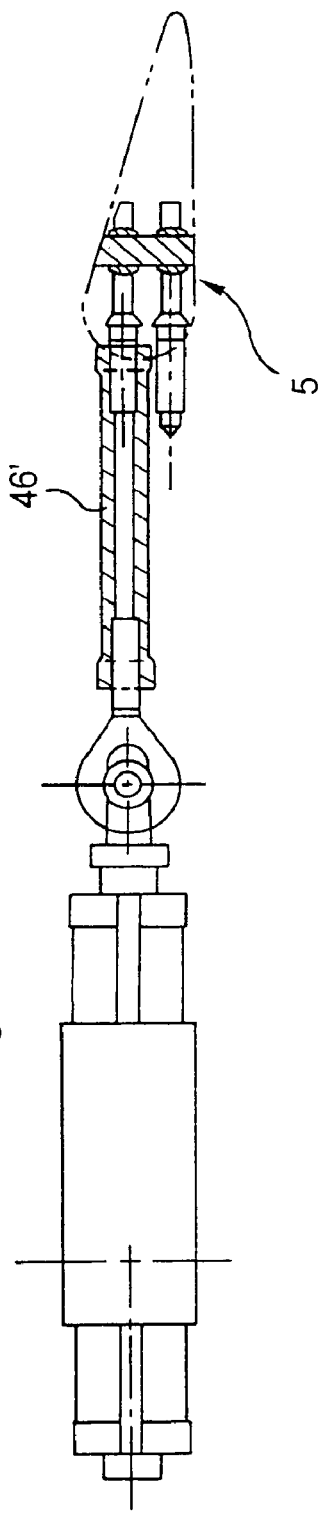
FIG. 4 shows a variant of the invention.

With reference to FIG. 4, in a variant of these embodiments, the single connecting rod 46' is not bent. Thus, if the space available in the blade is limited, this variant can nevertheless enable the invention to be implemented.

Naturally, the present invention is capable of numerous variations in terms of implementation. Although several embodiments are described above, it will be understood that it is not conceivable to identify exhaustively all possible embodiments. Naturally, it is possible to envisage replacing any of the means described by equivalent means without going beyond the ambit of the present invention.

Furthermore, depending on requirements, some other number of actuators could be provided, each actuator being associated with a respective main ball joint. Nevertheless, when the flap 5 is pivoted using two actuators, the two main ball joints associated with the two actuators are preferably spaced apart along the span of the flap 5 by a distance that is equal to half the span of the flap 5.

What is claimed is:

1. A rotorcraft rotor blade (1) having at least one trailing edge flap (5) that is tiltable, said flap (5) being suitable for pivoting about a virtual hinge axis (Y') extending substantially along the span of said blade (1) and of said flap (5), wherein said flap (5) is provided with at least one main ball joint (30) having an inner cage (32) and an outer cage (33), and a first shaft (31) secured to said flap (5), the front portion (33') of said outer cage (33) of the main ball joint (30) being connected to a linear actuator (10) that is arranged in said blade (1) and that enables said flap (5) to be pivoted, said first shaft (31) of the main ball joint (30) extending substantially perpendicularly to said virtual hinge axis (Y') about which said flap (5) pivots, wherein said flap includes a fastener ball joint (39) having an outer cage (37) and an inner cage (36), together with a second shaft (35), the front portion (37') of the outer cage (37) of said fastener ball joint (39) being secured to a stationary point of said blade.

2. A blade according to claim 1, wherein the axis of symmetry of said main ball joint (30) is arranged substantially at 25% of the chord of said flap (5) going from the leading edge of said flap (5).

3. A blade according to claim 1, wherein said main ball joint (30) is selflubricating.

4. A blade according to claim 1, wherein said front portion (33') of the outer cage (33) of said main ball joint (30) is connected to said actuator (10) by a single connecting rod (46, 46').

5. A blade according to claim 1, wherein said first and second shafts (31, 35) coincide.

6. A blade according to claim 1, wherein said first and second shafts (31, 35) are offset relative to each other.

7. A blade according to claim 1, wherein said second shaft (35) is secured to the flap (5).

8. A rotorcraft rotor blade (1) having at least one trailing edge flap (5) that is tiltable, said flap (5) being suitable for pivoting about a virtual hinge axis (Y') extending substantially along the span of said blade (1) and of said flap (5), wherein said flap (5) is provided with at least one main ball joint (30) having an inner cage (32) and an outer cage (33), and a first shaft (31) secured to said flap (5), the front portion (33') of said outer cage (33) of the main ball joint (30) being connected to a linear actuator (10) that is arranged in said blade (1) and that enables said flap (5) to be pivoted, said first shaft (31) of the main ball joint (30) extending substantially perpendicularly to said virtual hinge axis (Y') about which said flap (5) pivots, wherein, for said blade (1) having two actuators (10, 10'), said flap (5) is provided with two main ball joints (30, 30') with the distance between said main ball joints (30, 30') along the span of the flap (5) being equal to half said span of said flap.

* * * * *